United States Patent
Trauernicht et al.

(10) Patent No.: US 11,585,402 B1
(45) Date of Patent: Feb. 21, 2023

(54) MAGNETORHEOLOGICAL DAMPER

(71) Applicant: Textron Inc., Providence, RI (US)

(72) Inventors: Jared L. Trauernicht, Corona, CA (US); Brian Russell Hopkins, Moreno Valley, CA (US); Eric Nels Anderfaas, Westminster, CA (US)

(73) Assignee: TEXTRON INNOVATIONS INC., Providence, RI (US)

( * ) Notice: Subject to any disclaimer, the term of this patent is extended or adjusted under 35 U.S.C. 154(b) by 0 days.

(21) Appl. No.: 17/209,930

(22) Filed: Mar. 23, 2021

Related U.S. Application Data

(63) Continuation of application No. 16/025,662, filed on Jul. 2, 2018, now Pat. No. 10,995,816, which is a continuation of application No. 15/170,380, filed on Jun. 1, 2016, now abandoned.

(51) Int. Cl.
*F16F 9/53* (2006.01)
*B60G 13/06* (2006.01)
*B62D 63/04* (2006.01)

(52) U.S. Cl.
CPC .............. *F16F 9/537* (2013.01); *B60G 13/06* (2013.01); *F16F 9/535* (2013.01); *B60G 2202/24* (2013.01); *B60G 2500/11* (2013.01); *B62D 63/04* (2013.01); *F16F 2224/045* (2013.01)

(58) Field of Classification Search
CPC ...... F16F 9/535; F16F 9/537; F16F 2224/045; B60G 13/06; B60G 2202/24; B60G 2500/11; B62D 63/04
See application file for complete search history.

(56) References Cited

U.S. PATENT DOCUMENTS

| | | |
|---|---|---|
| 6,260,675 B1 | 7/2001 | Muhlenkamp |
| 6,279,702 B1 | 8/2001 | Koh |
| 6,311,810 B1 | 11/2001 | Hopkins et al. |
| 6,382,369 B1 * | 5/2002 | Lisenker .................. F16F 9/535 188/267.2 |
| 6,386,343 B1 | 5/2002 | Robinson et al. |
| 6,390,252 B1 | 5/2002 | Namuduri et al. |
| 6,547,044 B2 * | 4/2003 | Lisenker ................ B60G 15/07 188/267.2 |
| 6,740,125 B2 | 5/2004 | Mosler |
| 6,953,108 B2 | 10/2005 | Anderfaas et al. |
| 7,232,016 B2 | 6/2007 | Namuduri |

(Continued)

*Primary Examiner* — Thomas W Irvin
(74) *Attorney, Agent, or Firm* — Sandberg, Phoenix & von Gotard, P.C.

(57) ABSTRACT

A magnetorheological damper, wherein the damper comprises a housing that is at least partially filed with a magnetorheological fluid, and a magnetorheological valve disposed within the housing. The valve includes a magnetically permeable core having at least one coil reservoir formed therein, and at least one conductor coil, wherein each conductor coil is disposed around a portion of the core within a respective one of the coil reservoir(s). The valve additionally includes a fluid flow path adjacent the conductor coil(s). The fluid flow path is structured and operable to allow the magnetorheological fluid to flow adjacent the conductor coil(s). The valve further includes at least one coil cover, wherein each coil cover is disposed over a respective one of the coil(s) such that the respective coil is protected from exposure to magnetorheological fluid flowing through the fluid flow path.

15 Claims, 10 Drawing Sheets

(56) References Cited

U.S. PATENT DOCUMENTS

| | | | |
|---|---|---|---|
| 7,234,575 B2 | 6/2007 | Anderfaas et al. | |
| 7,600,616 B2 | 10/2009 | Anderfaas et al. | |
| 7,900,755 B2 * | 3/2011 | Browne | F16F 9/537 |
| | | | 188/267.2 |
| 7,958,979 B2 | 6/2011 | Sekiva et al. | |
| 8,051,961 B2 | 11/2011 | Azekatsu et al. | |
| 8,286,763 B2 | 10/2012 | Nehl et al. | |
| 8,327,984 B2 | 12/2012 | Foister et al. | |
| 8,413,773 B2 | 4/2013 | Anderfaas et al. | |
| 8,651,250 B2 * | 2/2014 | Nehl | F16F 9/535 |
| | | | 188/267.2 |
| 8,931,604 B2 | 1/2015 | Marble | |
| 8,985,288 B2 * | 3/2015 | Battlogg | F16K 31/0675 |
| | | | 188/267.2 |
| 9,205,717 B2 | 12/2015 | Brady et al. | |
| 2002/0130000 A1 * | 9/2002 | Lisenker | F16F 9/535 |
| | | | 188/269 |
| 2006/0260891 A1 | 11/2006 | Kruckemeyer et al. | |
| 2008/0060710 A1 | 3/2008 | Carlson et al. | |
| 2009/0294231 A1 * | 12/2009 | Carlson | F16F 9/535 |
| | | | 188/267.2 |
| 2012/0292143 A1 * | 11/2012 | Anderfaas | F16F 9/537 |
| | | | 188/267.2 |
| 2012/0313020 A1 * | 12/2012 | Battlogg | F16K 31/0675 |
| | | | 188/267.2 |
| 2014/0138195 A1 | 5/2014 | Anderfaas et al. | |
| 2015/0034433 A1 | 2/2015 | Carlson et al. | |
| 2015/0184769 A1 | 7/2015 | Battlogg et al. | |
| 2016/0215850 A1 | 7/2016 | Elliott | |
| 2016/0265617 A1 | 9/2016 | Lee | |
| 2019/0128362 A1 | 5/2019 | Naserimojarad et al. | |

* cited by examiner

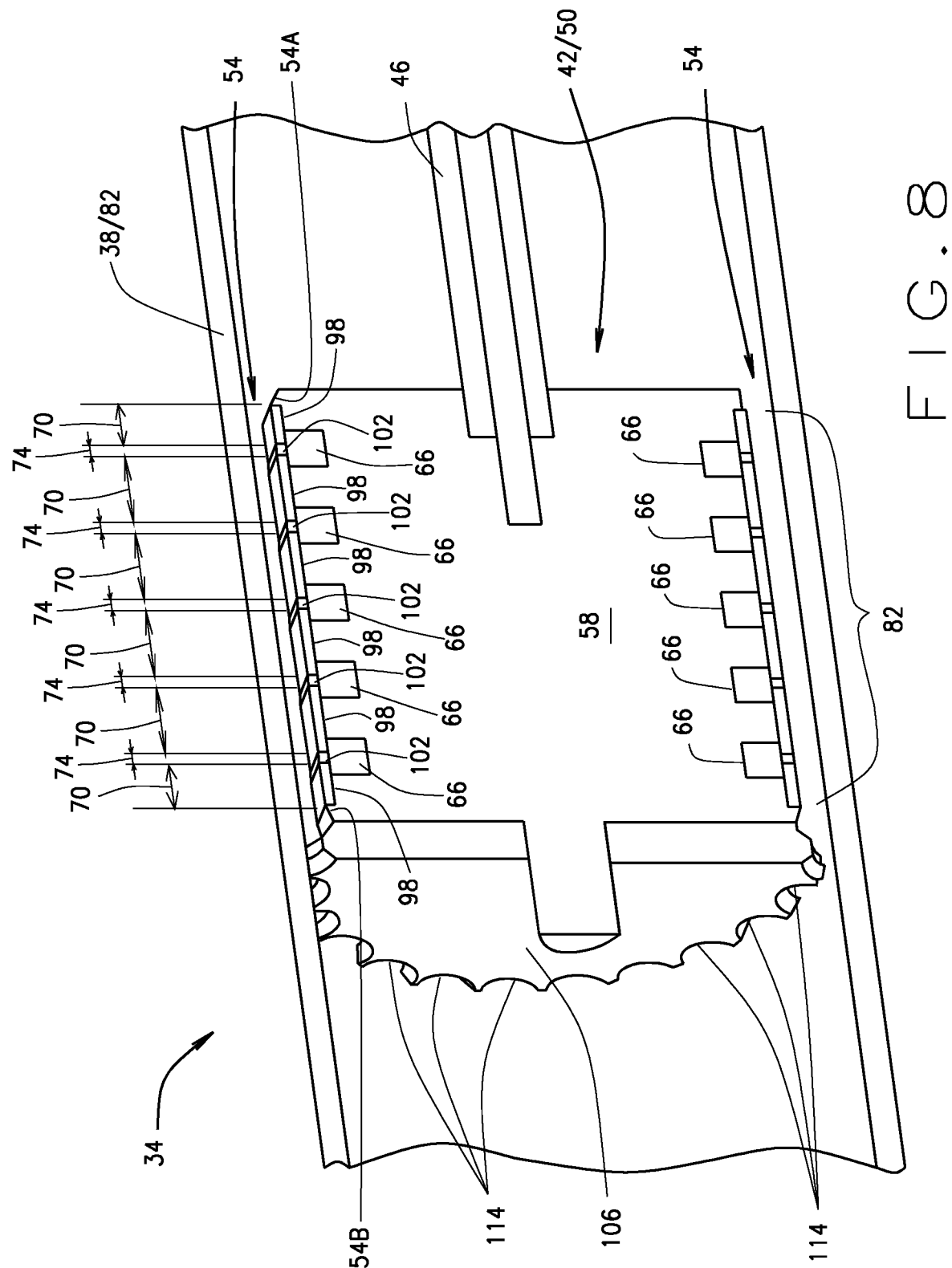

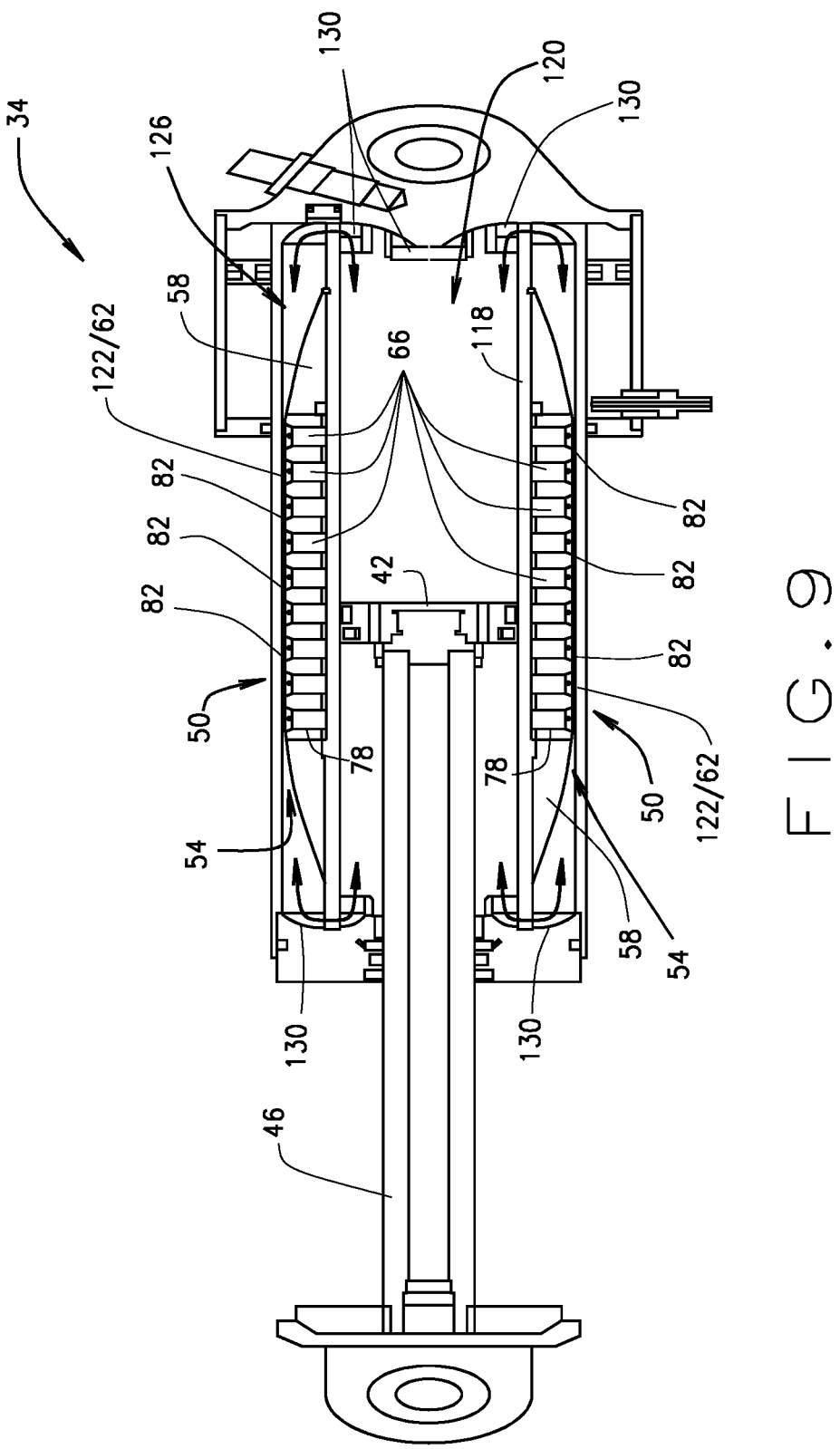

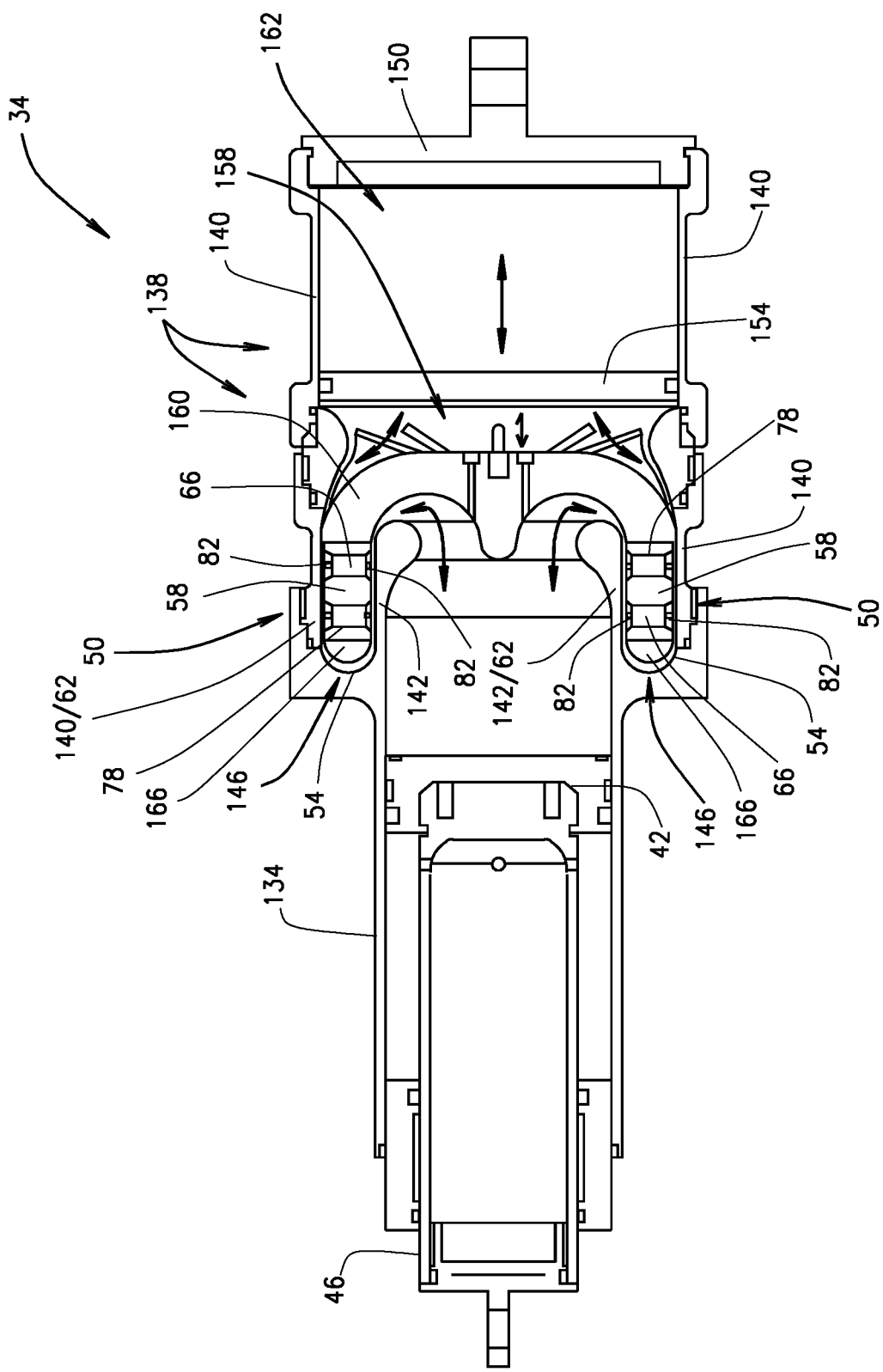

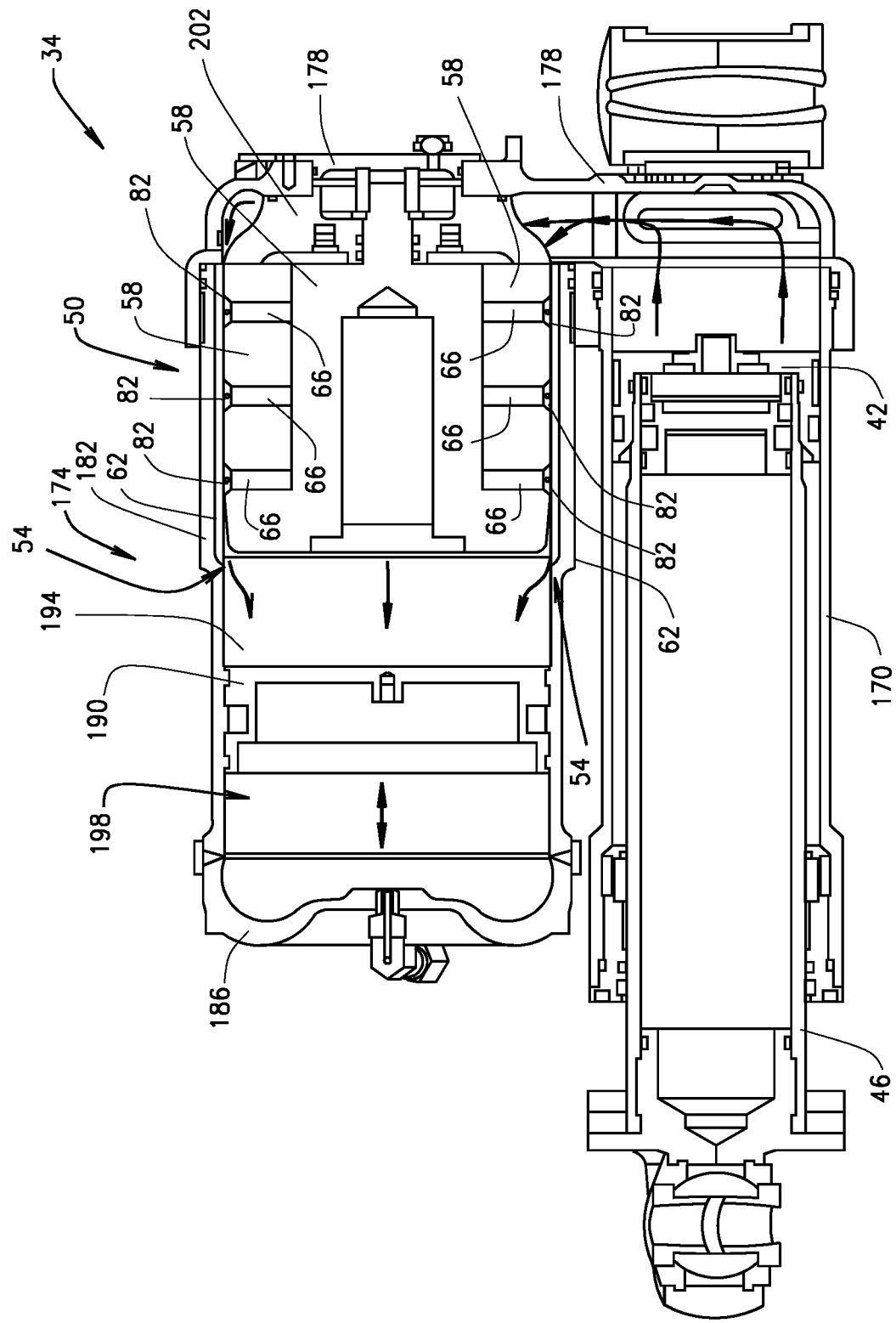

MAGNETORHEOLOGICAL DAMPER

CROSS-REFERENCE TO RELATED APPLICATIONS

This application is a continuation of U.S. patent application Ser. No. 16/025,662, filed Jul. 2, 2018, which is a continuation of U.S. patent application Ser. No. 15/170,380 filed on Jun. 1, 2016. The disclosures of the above applications are incorporated herein by reference in their entirety.

FIELD

The present teachings relate to vehicle suspensions, and more particularly to magnetorheological dampers for computer controlled vehicle suspension systems.

BACKGROUND

The statements in this section merely provide background information related to the present disclosure and may not constitute prior art.

A critical performance criterion in control of a vehicle suspension magnetorheological (MR) damper is the control ratio. For high quality suspension performance, the MR damper needs to have a high control ratio. The control ratio is the maximum on-state force (e.g., the maximum force the damper can make with the fluid fully energized) relative to the minimum off-state force (e.g., the minimum force the damper can make with no flux acting on the fluid) for a wide range of damper velocities. Generally, to achieve a high control ratio it is desired to have an active length of a MR valve of the damper be as long as possible and an inactive length as short as possible. The active length is the section of the MR valve where the fluid is energized by a magnetic field, whereas the inactive length is the section of the MR valve where the fluid is not energized.

Known MR dampers typically have an energizing coil wherein the entire length of its external faces is exposed to the MR fluid within the damper. This subjects the coil to erosion by MR fluid and also defines a relatively long inactive length, e.g., an inactive length that is substantially equal to the length of the coil. Due to the exposed coil, the active length of most known MR dampers is typically about 50% of the longitudinal length of the valve, and hence, the inactive length of most known MR dampers is typically about 50% of the longitudinal length of the valve.

SUMMARY

A magnetorheological damper, wherein the damper comprises a housing that is at least partially filed with a magnetorheological fluid, and a magnetorheological valve disposed within the housing. The valve includes a magnetically permeable core having at least one coil reservoir formed therein, and at least one conductor coil, wherein each conductor coil is disposed around a portion of the core within a respective one of the coil reservoir(s). The valve additionally includes a fluid flow path adjacent the conductor coil(s). The fluid flow path is structured and operable to allow the magnetorheological fluid to flow adjacent the conductor coil(s). The valve further includes at least one coil cover, wherein each coil cover is disposed over a respective one of the coil(s) such that the respective coil is protected from exposure to magnetorheological fluid flowing through the fluid flow path.

In various embodiments, each coil cover comprises a multi-section coil cover that includes at least one magnetically permeable section fabricated of a magnetically permeable material such that each magnetically permeable section provides a portion of an active length of the valve, and at least one magnetic isolator section fabricated of a non-magnetically permeable material such that each magnetic isolator section provides at least a portion of an inactive length of the valve.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 8 is an isometric cross-sectional view of the magnetorheological valve shown in FIGS. 2, 3, 4 and 5, in accordance with yet other various embodiments of the present disclosure.

FIG. 9 is a side cross-sectional view of 2, 3, 4 and 5, in accordance with still yet other various embodiments of the present disclosure.

FIG. 10 is a side cross-sectional view of 2, 3, 4 and 5, in accordance with yet still other various embodiments of the present disclosure.

FIG. 11 is a side cross-sectional view of 2, 3, 4 and 5, in accordance with further other various embodiments of the present disclosure.

DETAILED DESCRIPTION

Figure 1:
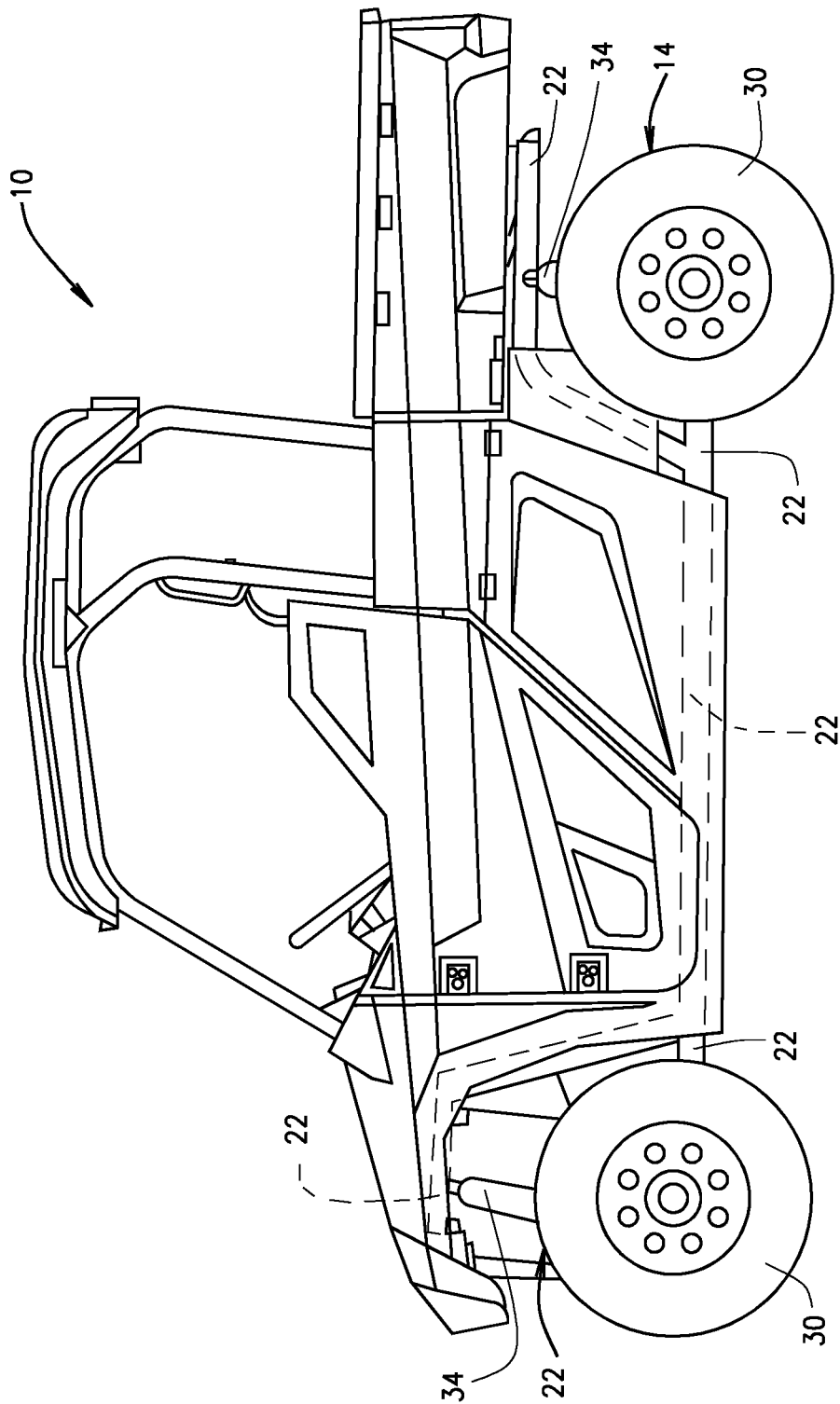
FIG. 1 is a side view of a vehicle having a suspension system including at least one magnetorheological damper in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

The term code, as used herein, can include software, firmware, and/or microcode, and can refer to one or more programs, routines, functions, classes, and/or objects. The term shared, as used herein, means that some or all code from multiple modules can be executed using a single (shared) processor. In addition, some or all code from multiple modules can be stored by a single (shared) memory. The term group, as used above, means that some or all code from a single module can be executed using a group of processors. In addition, some or all code from a single module can be stored using a group of memories.

The apparatuses/systems and methods described herein can be implemented by one or more computer programs executed by one or more processors. The computer programs include processor executable instructions that are stored on a non-transitory, tangible, computer-readable medium. The computer programs can also include stored data. Non-limiting examples of the non-transitory, tangible, computer-readable medium are nonvolatile memory, magnetic storage, and optical storage.

FIG. 1 illustrates, by way of example, a vehicle 10 that includes a suspension system (generally indicated at 14) that comprises a magnetorheological damper, in accordance with various embodiments of the present disclosure. The vehicle 10 can be any vehicle that generally includes a chassis (or frame) 22 to which a body 26 is connected (the body including such components as a front cowl, fenders, doors, side panels, quarter panels, a dash panel, etc.), two or more wheels 30, and the suspension system 14 that operatively connects the wheels 30 to the chassis 22 and/or portions of the body 26. For example, it is envisioned that the vehicle 10 can be a car, truck, motorcycle, sport utility vehicle (SUV), bus, recreational vehicle (RV), or any other vehicle designated for use on roadways, or vehicle 10 can be any full size and/or lightweight and/or utility and/or low-speed vehicle that is not designated for use on roadways, such as a maintenance vehicle, a cargo vehicle, a shuttle vehicle, a golf car, an all-terrain vehicle (ATV), a utility-terrain vehicle (UTV), a recreational off-highway vehicle (ROV), a side-by-side vehicle (SSV), a worksite vehicle, a buggy, a snowmobile, a tactical vehicle, etc.

Figure 2:
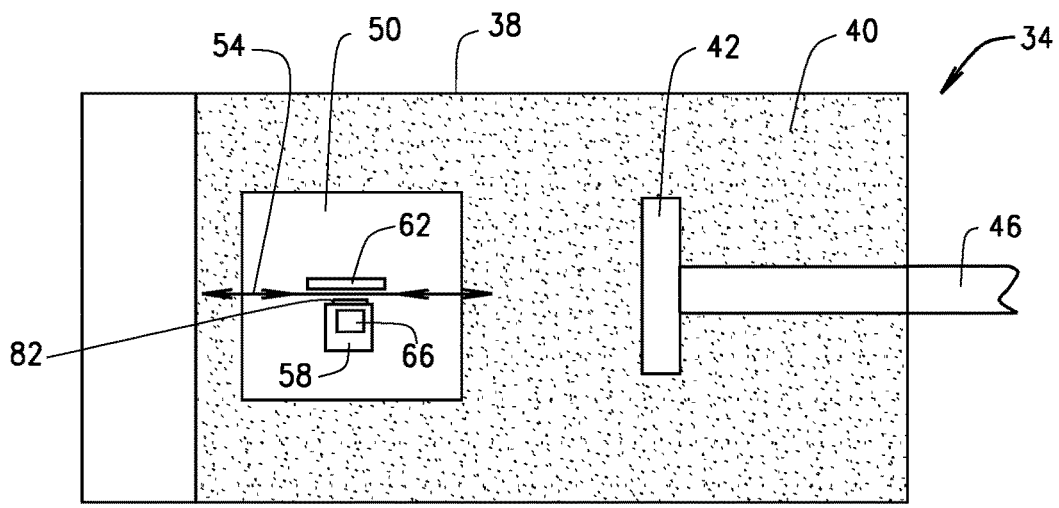
FIG. 2 is block diagram of a generic embodiment of the magnetorheological damper shown in FIG. 1 including a magnetorheological valve, in accordance with various embodiments of the present disclosure.
Figure 3:
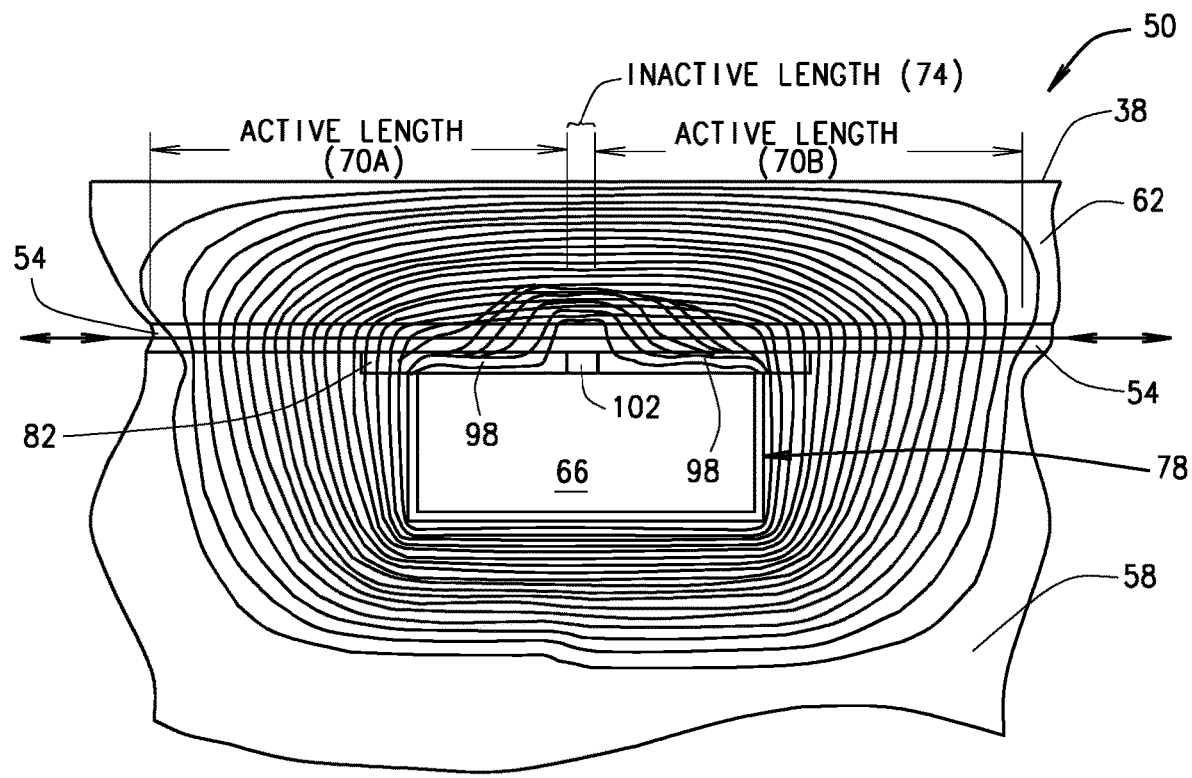
FIG. 3 is a schematic of a cross-section of the generic embodiment magnetorheological valve shown in FIG. 2, in accordance with various embodiments of the present disclosure.

Referring now to FIGS. 1, 2 and 3, in various embodiments, the suspension 14 includes at least one magnetorheological (MR) damper 34. Each MR damper 34 operatively connects a respective one of the wheels to the vehicle chassis 22 and/or body 26. Although the suspension 14 can include more than one MR damper 34, for simplicity and clarity, only a single MR damper 34 of the present disclosure will be described herein. The MR damper 34 generally includes housing 38 at least partially filled with a magnetorheological (MR) fluid 40, a piston 42 disposed within the housing 38, a piston rod 46 connected to the piston 38, and a magnetorheological (MR) valve 50. The piston rod 46 extends through an end of the housing 38 and is operatively connectable to either a respective wheel 30 of the vehicle 10 or the chassis 22 and/or a portion of the body 26. Depending on the connection location of the piston rod 46, an opposing end of the housing 38 is operatively connectable to the other of the respective wheel 30 or the chassis 22 and/or a portion of the body 26. Accordingly, when the MR damper 34 is mounted between a wheel 30 and the chassis 22 and/or a portion of the body 26, travel of the vehicle 10 across a terrain will cause the wheels 30 and the body 26 to move relative to each other such that the MR damper 34 is subject to compression (or jounce) and extension (or rebound), which bidirectionally moves the piston 42 within the housing 38.

Compression (or jounce) and extension (or rebound) of the MR damper 34 causes the piston 42 to move within the damper housing 38. As the piston 42 moves within the housing 38 the MR fluid 40 is forced to flow through the MR valve 50. More specifically, the MR fluid 40 is forced to flow through at least one fluid flow channel (or elongated orifice) 54 of the MR valve 50. The channel(s) 54 is/are disposed, provided or formed between a magnetically permeable core 58 and a magnetically permeable flux ring 62 of the valve 50. The MR valve 50 additionally includes at least one conductor coil 66 that is disposed within the core 58 and in close proximity of the channel(s) 54. As the MR fluid 40 is forced through the channel(s) 54 and adjacent the conductor coil(s) 66, the conductor coil(s) 66 is/are controllably energized to generate magnetic flux between the core 58 and the flux ring 62 through which the MR fluid 40 flows. The one or more areas of the channel(s) 54 through which the magnetic flux is directed are referred to herein as the active sections of the channel(s) 54. Conversely, the one or more areas of the channel(s) 54 where no magnetic flux is directed, e.g., are not within a flux field, are referred to herein as the inactive sections of the channel(s) 54.

As the MR fluid 40 flows though the active sections of the channel(s) 54, and magnetic flux is being generated and directed across active sections, the flow properties of the MR fluid 40 are altered to controllably increase and decrease the pressure drop along the channel(s) 54. Particularly, As the MR fluid 40 flows though the active sections of the channel(s) 54 the shear strength, or shear stress, of the MR fluid 40 is controllably altered, as a result of the controlled strength of the magnetic flux. More particularly, when the MR fluid 40 flows through the flux field directed across the active sections of the channel(s) 54, metal particles within the MR fluid 40 align according to the flux field lines, thereby changing the shear strength of the MR fluid 40, making the MR fluid 40 "stiff", such that the MR fluid 40 does not flow through the channel(s) 54 as readily and easily as when it is not exposed to the flux field. By controlling the strength of the magnetic flux directed through the active sections of the channel(s) 54, the pressure drop along the channel(s) 54 can be controlled, thereby controlling the speed, or velocity, of movement of the piston 42 within the housing 38, thereby controlling the speed, or velocity, of the compression (or jounce) and extension (or rebound) of the MR damper 34, and thereby controlling the speed, or velocity of the movement of the wheels 30 and the body 26 relative to each other to attenuate undesired shock or vibration of the vehicle 10.

In various embodiments, operation of the MR valve 50, e.g., generation of the magnetic flux field, is controlled by one or more MR valve control algorithms executed by a damper controller, which can be a stand-alone controller, or part of one or more computer based vehicle control system(s). For example, in various embodiments the damper controller can be a hardware based module that is structured and operable to implement the MR valve control algorithm(s). For example, it is envisioned that the damper controller can comprise one or more, or be part of, application specific integrated circuit(s) (e.g., ASIC(s)), combinational logic circuit(s); field programmable gate array(s) (FPGA); processor(s) (shared, dedicated, or group), that execute the MR valve control algorithm(s) to provide the MR damper functionality described herein; or a combination of some or all of the above, such as in a system-on-chip. Alternatively, the damper controller can be part of one or more computer based vehicle control system(s) wherein the MR valve control algorithm(s) are stored in electronic memory of the system(s) and executed by one or more processor of the system(s). Execution of vehicle control software and algorithms, such as the MR valve control algorithms, is well understood by those skilled in the art, and need not be described further herein.

As described above, to improve suspension performance of an MR damper, e.g., MR damper 34, is it beneficial and desirable to have a high control ratio. As also described above, the control ratio is the maximum on-state force relative to the minimum off-state force. As used herein, the on-state of the state of the MR fluid 40 is when the MR fluid 40 is exposed to the magnetic flux field, and the off-state of the MR fluid 40 is when the MR fluid 40 is not exposed to the magnetic flux field. Hence, the maximum on-state force of the MR fluid 40 is the maximum shear strength of the MR fluid 40 that relates to the maximum magnetic flux that can be generated by the respective coil(s) 66, core 58 and flux ring 62. That is, the maximum on-state force of the MR fluid 40 is the maximum resistive force to movement of the piston 42 within the housing 38 that is generated by the MR valve 50 when the MR fluid 40 is fully energized by the maximum flux field that can be generated by the respective coil(s) 66, core 58 and flux ring 62. Similarly, the minimum on-state of the MR fluid 40 is minimum shear strength of the MR fluid 40 that relates to the minimum magnetic flux, e.g., zero or no magnetic flux, that can be generated by the respective coil(s) 66, core 58 and flux ring 62. That is, the minimum on-state force of the MR fluid 40 is the minimum resistive force to movement of the piston 42 within the housing 38 that is generated by the MR valve 50 when the MR fluid 40 is not, or minimally, energized relative to the minimum flux field that can be generated by the respective coil(s) 66, core 58 and flux ring 62.

Furthermore, as described above, to achieve a high control ratio it is desirable to have a total active length of the MR valve, e.g., MR valve 50, be as long as possible and a total inactive length be as short as possible. As used herein, the total active length the MR valve 50, is the cumulative length of the one or more active sections of the channel 54, e.g., the cumulative length of the sections of the channel where the MR fluid 40 is energized by a magnetic field. For example, the total active length of the channel 54 shown in FIG. 3 is the cumulative length of active lengths 70A and 70B. Similarly, as used herein, the inactive length the MR valve 50, is the cumulative length of the one or more inactive sections of the channel 54, e.g., the cumulative length of the sections of the channel where the MR fluid 40 is not energized by a magnetic field. For example, the total inactive length of the channel 54 shown in FIG. 3 is the length of inactive length 74.

As used herein, the term length will be understood to refer to dimensions parallel with and/or collinear to a longitudinal axis of the fluid flow channel 54 along which the MR fluid flows.

As further described above, the entire length of the external face of the conductor coil(s) of prior art MR valves is typically open to fluid flow channel and therefore exposed to MR fluid as the fluid flows through the channel, thereby subjecting coil(s) to erosion by the MR fluid. Additionally, due to the exposure of the entire face of the coil(s) to channel and MR fluid, the properties and characteristics of magnetic flux fields, the flux field generated by such prior art coil(s) will not be directed across the channel and through the fluid directly adjacent the face of the coil(s). Therefore, the inactive length of such prior art valves is substantially equal to the length of the coil face(s), which creates a relatively long inactive length of the valve, which affects the control ratio of the valve, e.g., limits the maximum control ratio.

Figure 4:
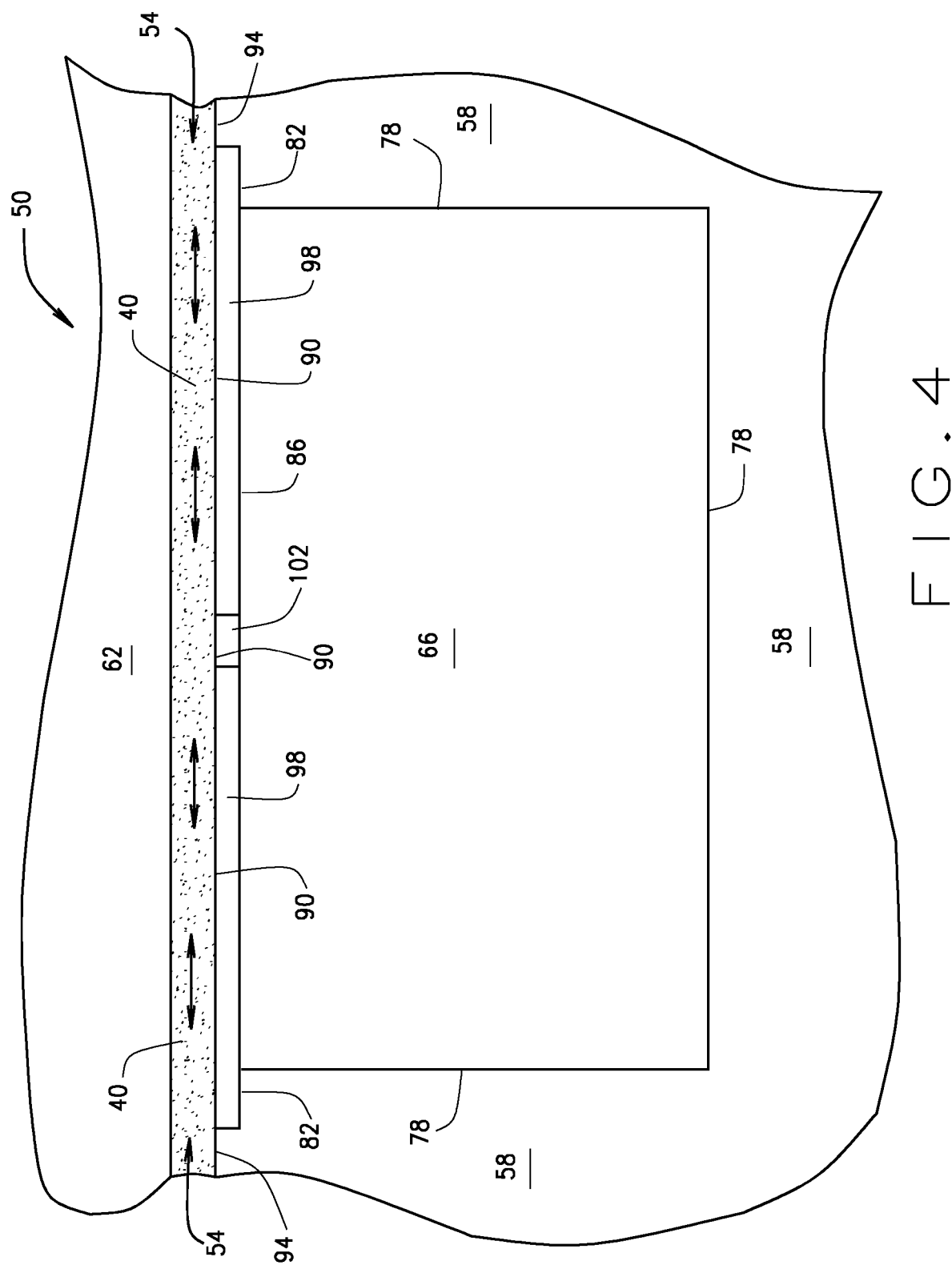
FIG. 4 is an enlarged view of a portion of the schematic shown in FIG. 3, in accordance with various embodiments of the present disclosure.

Referring now to FIGS. 2, 3 and 4, further to the description above, in various embodiments, the magnetically permeable core 58 comprises at least one coil reservoir 78 formed therein and each conductor coil 66 is disposed around a portion of the core 58 within a respective one of the coil reservoir(s) 78. Additionally, in various embodiments, the MR valve 50 comprises at least one coil cover 82. In various embodiments, each coil cover can be disposed over at least a portion of the external face 86 of a respective one of the coil(s) 66 (e.g., the face of the coil 66 closest to the fluid flow channel 54). For example, in various embodiments, each coil cover 82 is disposed over the entire external face 86 of a respective one of the coil(s) 66 such that the respective coil 66 is protected from exposure to the MR fluid 40 within the fluid flow channel 78. In various implementations, each coil cover 82 is recessed within the core 58, and extends across the entire coil reservoir 78 and coil external face 86 such that an external face 90 of each coil cover 82 (e.g., the face of the cover 82 exposed to the fluid follow channel 54 and the MR fluid 40 therein) is flush with an internal face 94 of the fluid flow channel 54. Therefore, the flow of the MR fluid 40 through the fluid flow channel 54 is not disturbed, impeded, disrupted or interfered with by the respective coil cover 82.

Figure 5:
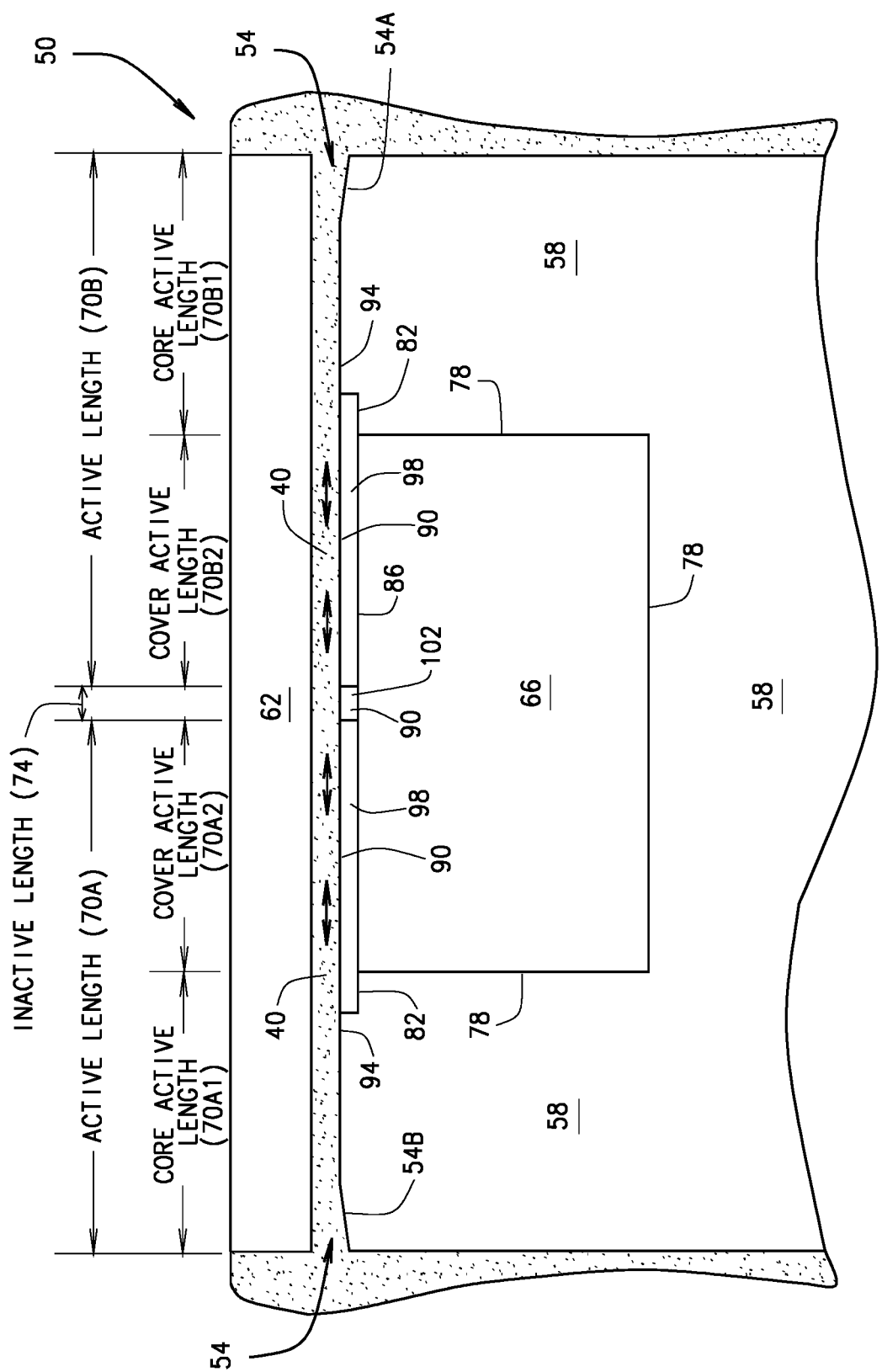
FIG. 5 is an enlarged cross-sectional view of a portion of the magnetorheological valve shown in FIGS. 2, 3 and 4, in accordance with various embodiments of the present disclosure.

Referring now to FIGS. 3, 4 and 5, in various embodiments, each coil cover 82 is a multi-section coil cover comprising at least one active section 98 disposed over a portion of the respective coil 66 and fabricated of a magnetically permeable material, and at least one inactive section 102 disposed over a portion of the respective coil 66 and fabricated of a non-magnetically permeable material. Since the active section(s) 98 is/are fabricated of a magnetically permeable material, the flux field generated by the respective coil 66 will flow through the entire length of the active section(s) 98 and be directed across the fluid flow channel 54 into the flux ring 62 along the length of the active section(s) 98. Conversely, since the inactive section(s) 102 is/are fabricated of a non-magnetically permeable material, the inactive section(s) 102 provide a magnetic isolator such that the flux field generated by the respective coil 66 will not flow through the inactive section(s) 102 and not be directed across the fluid flow channel 54 along the length of the inactive section(s) 102. Hence, the active section(s) 98 of the coil cover 82 will provide at least a portion of the total active length of the MR valve 50, and the inactive section(s) 102 will provide at least a portion of the total inactive length.

Moreover, by disposing the active section(s) 98 of the coil cover 82 over a portion of the respective coil 66, the active length of the fluid flow channel 54 (and hence, the active length of the MR valve 50) is substantially greater than the active length of known MR valves, and furthermore, the inactive length of the fluid flow channel 54 (and hence, the inactive length of the MR valve 50) is substantially smaller than the inactive length of known MR valves. Therefore, the maximum control ratio of the MR valve 50 (e.g., the maximum on-state force relative to the minimum off-state force) can be greatly increased from that of known MR valves. Specifically, by disposing the active section(s) 98 of the coil cover 82 over a portion of the respective coil 66, the active length of the fluid flow channel 54, and hence, the active length of the MR valve 50, is extended beyond the portion/length of the channel 54 that is adjacent the core 58. For example, as shown in FIG. 5, the active length 70A comprises the core active length 70A1 where the flux field (see FIG. 3) is generated through and directed across the fluid flow channel 54 by the core 58, plus the cover active length 70A2 where the flux field (see FIG. 3) is additionally generated through and directed across the fluid flow channel 54 by the active cover section 98; and further, the active length 70B comprises the core active length 70B1 where the flux field is generated through and directed across the fluid flow channel 54 by the core 58, plus the cover active length 70B2 where the flux field is generated through and directed across the fluid flow channel 54 by another active cover section 98. Accordingly, the total active length of the example MR valve 50 shown in FIG. 5 is the active length 70A (e.g., core active length 70A1 plus cover active length 70A2) plus the active length 70B (e.g., core active length 70B1 plus cover active length 70B2). Additionally, the total inactive length of the example MR valve 50 shown in FIG. 5 is merely the length of the inactive section 102.

As illustrated, in various embodiments, the total or comprehensive length of the active section(s) 98 of the coil cover 82 can be substantially greater than the total or comprehensive length of the inactive section(s) 102. For example, in various embodiments, the comprehensive length of the active section(s) 98 can be 60% to 95% of the total length of the coil cover 82, and the comprehensive length of the inactive section(s) 102 can be 5% to 40% of the total length of the coil cover 82. Moreover, due to the active section(s) 98 of the coil cover 82, the total active length of the MR valve 50 can be substantially greater than the total inactive length of the MR valve 50. For example, in various embodiments that total active length of the MR valve 50 can be 60% to 95% of the total length of the fluid flow channel 54, and the total inactive length of the MR valve 50 can be 5% to 40% of the total length of the fluid flow channel 54. Furthermore, since the on-state and off-state forces of the MR valve 50 are directly related to the total active length and the total inactive length, respectively, the increased total active length and the decreased total inactive length provided by the multi-section coil cover 82, MR valve 50 can be configured or structured to have a control ratio that is considerably higher than known MR valve.

It should be noted, however, that the active section(s) 98 and inactive section(s) 102 of the coil cover 82 can have any desired length such that, should it be desirable, the comprehensive length of the inactive section(s) 102 can be greater than the comprehensive length of the active section(s) 98. For example, should it be desirable, the comprehensive length of the inactive section(s) 102 can be as much as 90% to 95% of the total length of the coil cover 82, while the comprehensive length of the active section(s) 98 can be little 5% to 10% of the total length of the coil cover 82.

Figure 6:
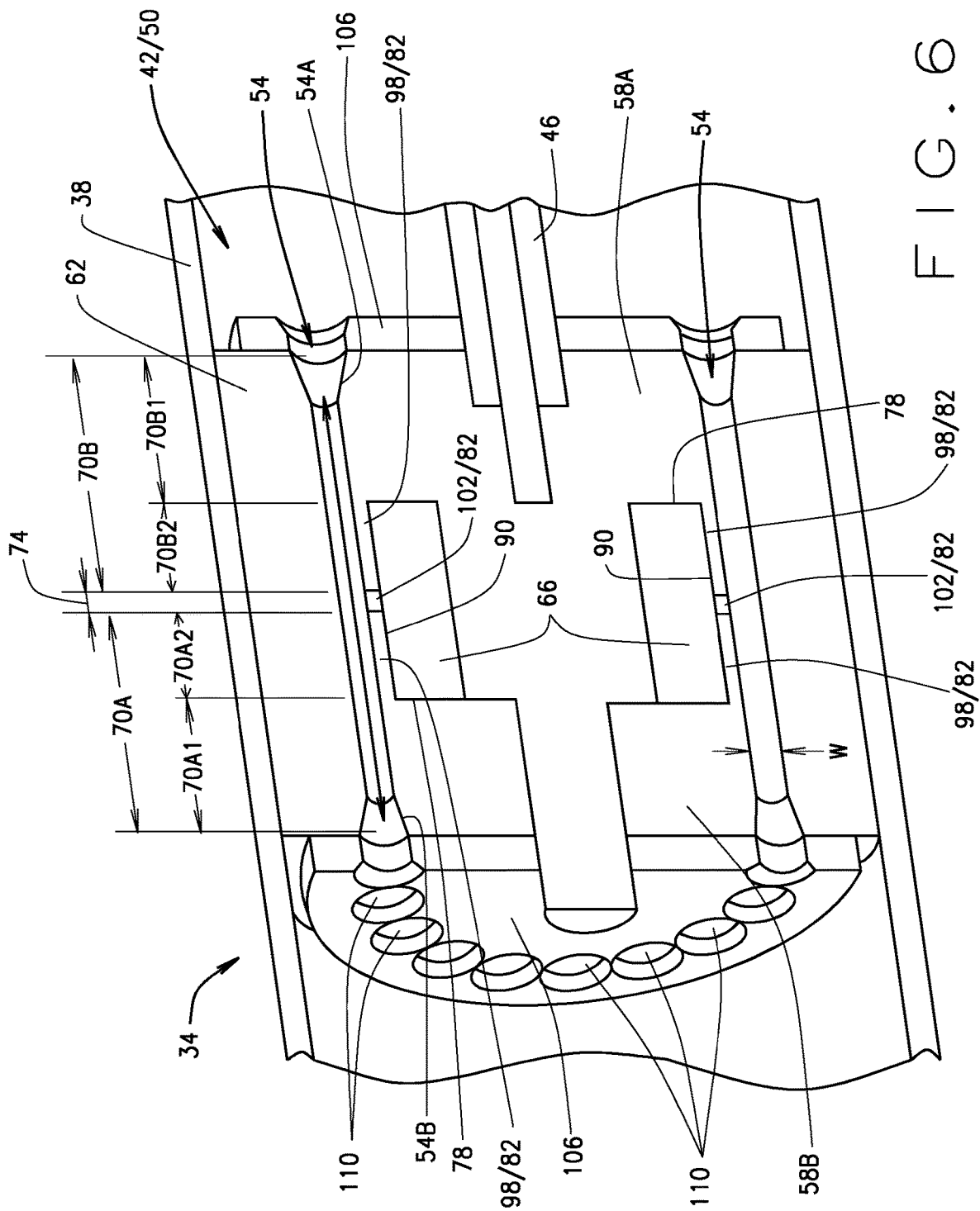
FIG. 6 is an isometric cross-sectional view of the magnetorheological valve shown in FIGS. 2, 3, 4 and 5, in accordance with various embodiments of the present disclosure.
Figure 7:
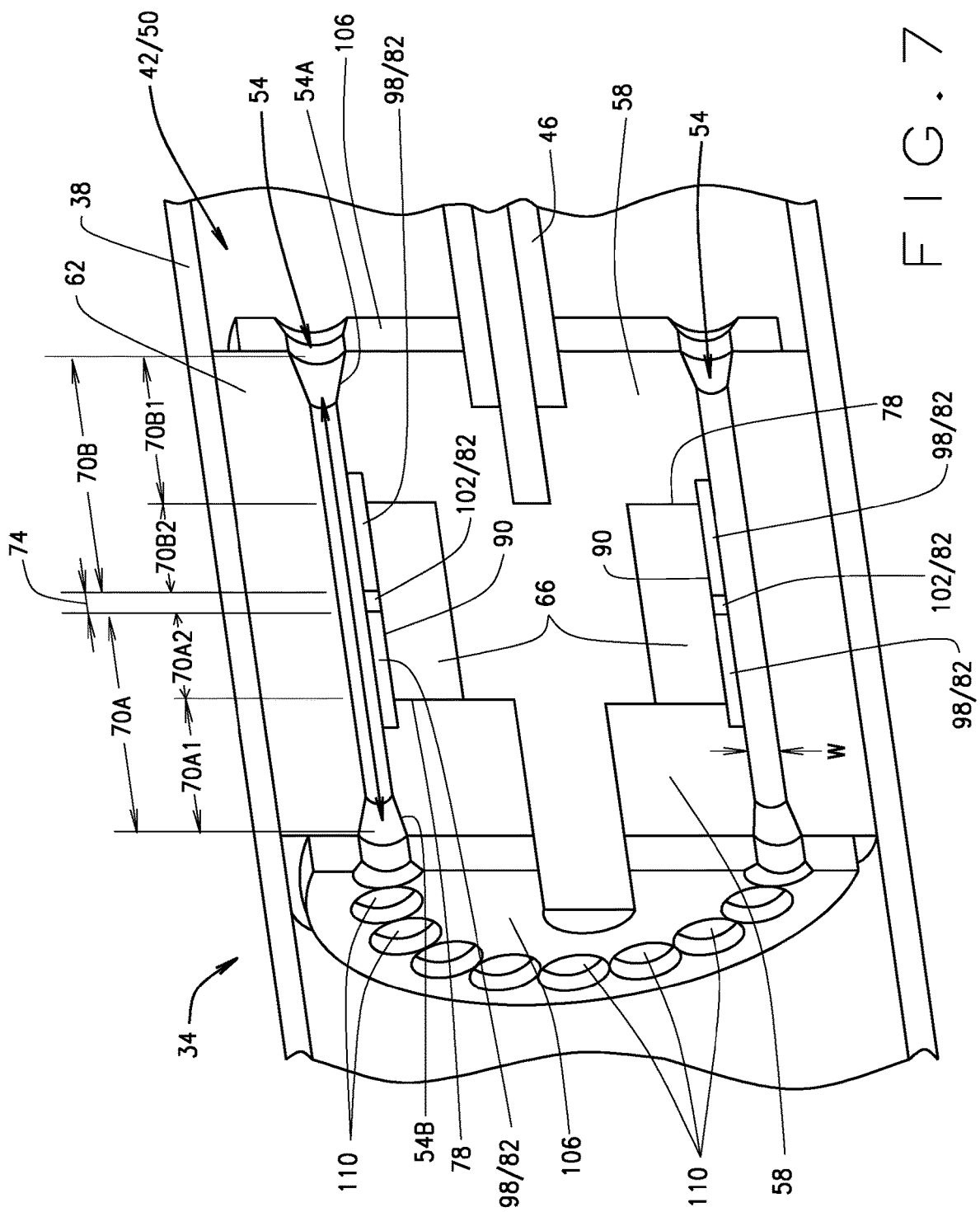
FIG. 7 is an isometric cross-sectional view of the magnetorheological valve shown in FIGS. 2, 3, 4 and 5, in accordance with various other embodiments of the present disclosure.

Referring now to FIGS. 6, 7 and 8, in various embodiments the MR valve 50 can be incorporated in the piston 42 of the MR damper 34. That is, in such embodiments, the piston 42 comprises the MR valve 50.

Referring particularly to FIGS. 6 and 7, in various implementations wherein the piston 42 comprises the MR valve 50, the flux ring 62 comprises an annular ring sized to fit within an interior of the damper housing 38 such that the MR fluid 40 (not shown) cannot pass between the flux ring 62 and the housing 38. In various instances, the MR damper 34 can include a sealing device (not shown), e.g., one or more O-ring, disposed between the flux ring 62 and the housing 38 to seal the interface therebetween so that MR fluid 40 cannot flow between the flux ring 62 and the housing 38. Additionally, in such implementations, the core 58 is cylindrically shaped and centrally disposed within the annular flux ring 62 such that an annular fluid flow channel 54 is defined between the flux ring 62 and the core 58. The cylindrical core 58 can comprise one or more core sections that are connectable or mateable to provide the core 58. The at least one coil reservoir 78 can be formed within one or more of the core sections and the conductor coil(s) 66 is/are disposed around a portion of the core 58 within a respective coil reservoir 78. Further, in such implementations, the piston 42 includes at least one non-magnetically permeable end cap 106 disposed at least one end of the piston 42. The end cap(s) 106 are connected, or mounted, to both the flux ring 62 and the core 58 such that the annular fluid flow channel 54 is maintained therebetween and has a consistent width W throughout the channel 54. The end cap(s) 106 is/are fabricated of a non-magnetically permeable material and comprise a plurality of orifices 110 aligned with the fluid flow channel 54 to allow the MR fluid 40 (not shown) to flow through fluid flow channel 54 as the piston 42 moves within the housing 38.

As illustrated by way of example in FIG. 6, in various embodiments the cylindrical core 58 can comprise a plurality of cylindrical core sections that are connectable or mateable to provide the core 58. For example, the core 58 can include a first core section 58A and a second core section 58B. As described above, in various embodiments, each coil cover 82 can be a multi-section coil cover comprising at least one active section 98 disposed over a portion of the respective coil 66 and fabricated of a magnetically permeable material, and at least one inactive section 102 disposed over a portion of the respective coil 66 and fabricated of a non-magnetically permeable material. For example, as illustrated in FIG. 6, in various implementations, the first core section 58A can be formed or fabricated to comprise a magnetically permeable active section 98 (e.g., a first active section) that is integrally formed therewith and extends over a first portion of the respective coil reservoir 78 such that the active section 98 is disposed over a first portion of the respective conductor coil 66. In such implementations, the cover 82 can include an inactive section 102 that comprises a magnetic isolator band disposed over a second portion of the respective conductor coil 66. It is envisioned that, in various embodiments, the first and second portions of the coil 66 can comprise the entire external coil face 90 such that the active section 98 (e.g., the first active section) extends over the entire coil face 90 except for the portion of the coil face 90 covered by the inactive section 102.

Alternatively, in various other embodiments, the second core section 58B can be formed or fabricated to comprise another magnetically permeable active section 98 (e.g., a second active section) that is integrally formed therewith and extends over a third portion of the respective coil reservoir 78 such that the active section 98 (e.g., the second active section) is disposed over a third portion of the respective conductor coil 66. In such embodiments, the inactive section 102 can be disposed around a longitudinal center portion of the coil face 90, and the active sections 98 (e.g., the first and second active sections) can be disposed over the substantially equal length remaining portions of the coil face 90 on both sides of the inactive section 102 of the cover 82.

As illustrated by way of example in FIG. 7, in various embodiments the cylindrical core 58 can comprise a single piece core 58 or comprise a plurality of cylindrical core sections that are connectable or mateable to provide the core 58. As described above, in various embodiments, each coil cover 82 can be a multi-section coil cover comprising at least one active section 98 disposed over a portion of the respective coil 66 and fabricated of a magnetically permeable material, and at least one inactive section 102 disposed over a portion of the respective coil 66 and fabricated of a non-magnetically permeable material. For example, as illustrated in FIG. 7, in various implementations, the multi-section coil cover 82 can be separate and independent from (e.g., not integrally formed with) the core 58. For example, the multi-section coil cover 82 can include a first active section 98 comprising a first band disposed over a first portion of the respective conductor coil 66, the inactive section comprising a magnetic isolator band disposed over a second portion of the conductor coil 66, and a second active section comprising a second band disposed over a third portion of the conductor coil 66. In various implementations, the inactive section 102 can be disposed around a longitudinal center portion of the coil face 90, and the first and second active sections 98 can be disposed over the substantially equal length remaining portions of the coil face 90 on both sides of the inactive section 102 of the cover 82.

Alternatively, in various other implementations, the inactive section 102 can be disposed around the coil face 90 at a longitudinal location other than the center portion of the coil face 90, and the first and second active sections 98 can be disposed over the unequal length remaining portions of the coil face 90 on both sides of the inactive section 102 of the cover 82. In still other implementations, it is envisioned that the multi-section coil cover 82 can include a plurality of the inactive sections 102 comprising a plurality of magnetic isolator bands disposed over a plurality of portions of the conductor coil 66, and three or more of active sections 98 disposed over a plurality of portions of the conductor coil 66, at least one of the active sections 98 being disposed between two adjacent inactive sections 102.

Although FIGS. 6 and 7 illustrate example embodiments of the MR valve 50 comprising the piston 42 having the annular flux ring 62 and the core 58 (e.g., single piece or multi-piece core 58) disposed within the flux ring 62 to define the annular fluid flow channel 54, wherein the MR valve 50 includes only a single conductor coil 66 and a single coil cover 82 (e.g., a multi-section cover 82), it is envisioned that in various embodiments, the MR valves 50 of FIGS. 6 and 7 can includes a plurality of conductor coils 66 disposed within the core 58 and a plurality of respective coil covers 82, wherein each cover 82 is disposed over a respective one of the coils 66 (as described below with regard to FIG. 8). Still further, it is envisioned that in various embodiments of the piston MR valve 50 illustrated and described with regard to FIGS. 6 and 7, the annular flux ring 62, as illustrated, can be eliminated and the cylindrical housing 38 can provide or comprise the flux ring 62 (as described below with regard to FIG. 8).

Referring now to FIG. 8, in various embodiments, wherein the piston 42 of the MR damper 34 comprises the MR valve 50 and the cylindrical housing 38 can comprise the flux ring 62. That is, in such embodiments the housing 38 can be fabricated from a magnetically permeable material and comprise the flux ring 62 of the MR valve 50. In such embodiments, the core 58 is cylindrically shaped and centrally disposed within the annular housing/flux ring 38/62 such that the annular fluid flow channel 54 is defined between the housing/flux ring 38/62 and the core 58. In such embodiments, the annular fluid flow channel 54 can have a larger annular diameter (e.g., the diameter defined by the diameter of the core 58), and a narrower width W than the embodiments shown in FIGS. 6 and 7, thereby reducing the off-state force and increasing the on-state force of the MR fluid flowing through the channel 54, which in turn, further increases the control ratio of the MR valve 34.

The core can be a single piece core, as illustrated by way of example, or a multi-piece core having two or more core sections that are connectable or mateable to provide the core 58. Additionally, in such embodiments, the MR valve 50 can include a single end cap 106 connected to a distal end of the core 58 (e.g., the end opposite the piston rod 46), wherein the end cap 106 comprises a scalloped peripheral edge comprising a plurality of semi-circular openings 114 aligned with the fluid flow channel 54 to allow the MR fluid 40 (not shown) to flow through fluid flow channel 54 as the piston 42 moves within the housing 38. Additionally, in various embodiments, the MR valve 50 can comprise a plurality of coil reservoirs 78 formed within the core 58 and a plurality of conductor coils 66, wherein each conductor coil 66 is disposed around a portion of the core 58 within a respective one of the coil reservoirs 78. In such embodiments, the MR valve 50 additionally includes a multi-section coil cover 82 comprising a plurality of inactive sections 102 and three or more active sections 98 disposed between and/or adjacent the inactive sections 102.

Referring now to FIGS. 5, 6, 7 and 8, it should be noted that in various embodiments wherein the housing 38 comprises the flux ring 62, as shown by way of example in FIG. 8, the MR damper 34 can reject heat quicker and easier than the embodiments wherein the MR damper 34 includes a flux ring 62 that is disposed within the housing 38, as shown by way of example in FIGS. 6 and 7. Particularly, having the housing 38 function as the flux ring 62 provides a shorter dissipation path for the heat generated within the MR damper 34. More particularly, the exposure of the outside of the housing to the ambient environment helps maintain the housing/flux ring 38/62 at a cooler temperature such that the housing/flux ring 38/62 will absorb and dissipate the generated heat more efficiently.

Additionally, in various embodiments, the ends 54A and 54B of the fluid flow channel 54 can be chamfered, angled, funnel shaped or include a bezel to provide a larger diameter at the ends 54A and 54B from that of a central portion of channel 54. The chamfered, angled, funnel shaped or bezelled ends 54A and 54B are structured and operable to allow the MR fluid to enter and exit the channel 54 more easily and with less turbulence and/or disruption, thereby increasing the on-state force, and decreasing the off-state force of the MR fluid flowing through the channel 54, which in turn, further increases the control ratio of the MR valve 34. Additionally, in various implementations, the orifices 110 and/or the openings 114 of the end cap(s) 106 can be chamfered, angled, funnel shaped or include a bezel to reduce the turbulence and/or disruption of the MR fluid entering and exiting the channel 54.

Referring now to FIG. 9, in various embodiments, the MR damper 34 can comprise an inner cylindrical body 118 that defines a cylindrical chamber 120 that is at least partially filled with MR fluid 40 (not shown) and in which the piston 42 is disposed. The inner cylindrical body 118 is centrally disposed within an outer cylindrical housing 122 such that an outer annular chamber 126 is defined between the inner cylindrical body 118 and the outer cylindrical housing 122. The outer annular chamber 126 is at least partially filled with MR fluid 40 and is fluidly connected with the inner cylindrical chamber 120 via windows 130 formed in the ends of the inner cylindrical body 118. In such embodiments, the MR valve 50 is disposed within the outer annular chamber 126. More particularly, in such embodiments, the core 58 comprises and annular (single piece or multi-piece) core having one or more coil reservoir 78 formed therein, each reservoir having a respective conductor coil 66 disposed therein as described above with regard to FIGS. 1, 2, 3, 4, 5, 6, 7 and/or 8. Additionally, the MR valve 50 further includes a coil cover 82 disposed over each of at least one respective coil 66, wherein each coil cover 82 can be a single piece or a multi-section coil cover as described above with regard to FIGS. 1, 2, 3, 4, 5, 6, 7 and/or 8. In various embodiments, the outer cylindrical housing 122 can comprise the flux ring 62, as described above with reference to FIG. 8, such that the annular fluid flow channel 54 is defined between the core 58 and the outer cylindrical housing/flux ring 122/62. Alternatively, although not shown, it is envisioned that the MR valve 50 can include a flux ring 62 that is separate from the outer cylindrical housing 122, as described above with reference to FIGS. 6 and 7.

In operation, the MR fluid 40 is moved within the inner cylindrical chamber 120 as the piston 42 is bidirectionally moved within the inner cylindrical chamber 120. The MR fluid 40 then passes through the windows 130 and into the outer annular chamber 126 at a respective end of the inner cylindrical body 118. Consequently, the MR fluid 40 is forced through the annular fluid flow channel 54 where the shear strength, or shear stress, of the MR fluid 40 is controllably altered as a result of the controlled strength of the magnetic flux generated by coil(s) 66, as described above. Accordingly, the compression (or jounce) and extension (or rebound) of MR damper 34 can be controlled. Moreover, when the coil cover(s) 82 is/are multi-section covers, as described herein, the control ratio of the MR valve 50, and hence the MR damper 34, is significantly increased.

Referring now to FIG. 10, in various embodiments, the MR damper 34 can comprise a cylindrical body 134 having a valve head 138 formed or disposed at a distal end thereof. The valve head 138 comprises an outer housing 140 and an inner wall 142 that define an annular recess 146 therebetween. The outer housing 140 and inner wall 142 can each be connected to the cylindrical body 134, integrally formed with the cylindrical body 134, or be combination thereof. The valve head 138 further includes an end wall 150 that seals the end of the MR damper 34, and a separator piston 154 disposed within the valve head 138. The separator piston 154 defines a MR fluid chamber 158 disposed on one side of the separator piston 154 and a gas chamber 162 disposed on the other side of the separator piston 154. The MR fluid chamber 158 includes the annular recess 146 formed between the outer housing 140 and the inner wall 142 of the valve head 138. The MR valve piston 42 is disposed within the interior of the cylindrical body 134. The portion of the cylindrical body interior disposed on the opposite side of the piston 42 from the piston rod 46 is at least partially filled with MR fluid 40 (not shown).

In such embodiments, the MR valve 50 includes a generally cup-shaped core positioner 160 having an annular wall 166 that is disposed within the annular recess 146 such that a substantially U-shaped annular fluid flow channel 54 is defined between annular wall 166 of the core positioner 160, a portion of the outer housing 140, and the inner wall 142. Moreover, an annular core 58 is integrally formed with, or disposed on the annular wall 166 of the core positioner 160 such that the core 58 is positioned within the annular recess 146 such that the substantially U-shaped annular fluid flow channel 54 passes along both an interior side of the core 58 (e.g., the side facing the inner wall 142) and an exterior side of the core 58 (e.g., the side facing the outer housing 140). Still further, the annular core 58 includes one or more coil reservoir 78 formed therein. A respective conductor coil 66 is disposed within each reservoir 78 such that, when energized, each coil 66 will generate a magnetic flux field that will be directed across the U-shaped annular fluid flow channel 54 along the portion of the channel 54 passing between core/coil 58/66 and the outer housing 140, and additionally directed across the U-shaped annular fluid flow channel 54 along the portion of the channel 54 passing between the core/coil 58/66 and the inner wall 142. Still yet further, the MR valve 50 of such embodiments includes a pair of coil covers 82, wherein one coil cover 82 is disposed over the interior side of the respective coil 66 (e.g., the side facing the inner wall 142) and the other coil cover 82 is disposed over the exterior side of the core 58 (e.g., the side facing the outer housing 140). Each coil cover 82 can be a single piece or a multi-section coil cover as described above with regard to FIGS. 1, 2, 3, 4, 5, 6, 7 and/or 8. In various embodiments, the valve head outer housing 140 and inner wall 142 can comprise flux rings. In various other embodiments, the MR valve 50 can comprise flux rings 62 be independent structures disposed between the core 58 and respective outer housing 140 and inner wall 142.

In operation, when the MR damper 34 is compressed (e.g., jounce motion) the MR fluid 40 is moved within the cylindrical body 134 as the piston 42 is moved toward the MR valve 50. Consequently, the MR fluid 40 is forced through the substantially U-shaped annular fluid flow channel 54 where the shear strength, or shear stress, of the MR fluid 40 is controllably altered, as a result of the controlled strength of the magnetic flux generated by coil(s) 66 and directed across both the portion of the channel 54 passing between the core/coil 58/66 and the outer housing 140, and the portion of the channel 54 passing between the core/coil 58/66 and the inner wall 142. Subsequently, the MR fluid 40 is forced into the MR fluid chamber 158 and forces the separator piston 154 move toward the end wall 150, thereby compressing the gas within the gas chamber 162. Thereafter, when the compressive forces on the MR damper 34 are removed, and/or extension forces are exerted on the MR damper 34 (e.g., rebound motion), the compressed gas within the gas chamber 162 forces the MR fluid 40 within the MR fluid chamber 158 back through the substantially U-shaped annular fluid flow channel 54 where the shear strength, or shear stress, of the MR fluid 40 is controllably altered, as a result of the controlled strength of the magnetic flux generated by coil(s) 66 and directed across both the portion of the channel 54 passing between the core/coil 58/66 and the outer housing 140, and the portion of the channel 54 passing between the core/coil 58/66 and the inner wall 142. Accordingly, the compression (or jounce) and extension (or rebound) of MR damper 34 can be controlled. Moreover, when the coil cover(s) 82 is/are multi-section covers, as described herein, the control ratio of the MR valve 50, and hence the MR damper 34, is significantly increased.

Referring now to FIG. 11, in various embodiments, the MR damper 34 can comprise a cylindrical body 170 and a valve canister 174 formed or disposed along an exterior side of the cylindrical body 170. In such embodiments, the MR damper 34 additionally includes a conduit cap 178 connected to ends of, and fluidly connecting, the cylindrical body 170 and the valve canister 174. The valve canister 174 comprises an outer housing 182 and an end wall 186 that seals the end of the valve canister 174, and a separator piston 190 disposed within the valve canister 174. The separator piston 190 defines a MR fluid chamber 194 disposed on one side of the separator piston 190 and a gas chamber 198 disposed on the other side of the separator piston 190. The MR valve piston 42 is disposed within the interior of the cylindrical body 170. The portion of the cylindrical body interior disposed on the opposite side of the piston 42 from the piston rod 46, and an interior of the conduit cap 178 are at least partially filled with MR fluid 40 (not shown).

In such embodiments, the core 58 is disposed within the valve canister between the MR fluid chamber 194 and the conduit cap 178 such that the annular fluid flow channel 54 passes between the core 58 and the flux ring 62, fluidly connecting the interior space of the conduit cap 178 with the MR fluid chamber 194. In various embodiments the flux ring 62 can comprise the outer housing 182, or in various other embodiments the flux ring 62 can be an independent structure disposed between the core 58 and the outer housing 182. Additionally, in various embodiments the core 58 can be a single piece core or in various other embodiments the core 58 a multi-piece core. The core 58 includes one or more coil reservoir 78 formed therein. A respective conductor coil 66 is disposed within each reservoir 78 such that, when energized, each coil 66 will generate a magnetic flux field that will be directed across the fluid flow channel 54 along the portion of the channel 54 passing between the core/coil 58/66 and the flux ring 62. Additionally, the MR valve 50 a coil cover 82 disposed over each coil 66. Each coil cover 82 can be a single piece or a multi-section coil cover as described above with regard to FIGS. 1, 2, 3, 4, 5, 6, 7 and/or 8.

In operation, when the MR damper 34 is compressed (e.g., jounce motion) the MR fluid 40 is moved within the cylindrical body 170 as the piston 42 is moved toward the conduit cap 178. Consequently, the MR fluid 40 is forced through the conduit cap 178 and directed into the annular fluid flow channel 54 by a diverter dome 202 disposed within the conduit cap 178 and connected to, or positioned adjacent, the core 58. As the MR fluid 40 passes through the fluid flow channel 54 the shear strength, or shear stress, of the MR fluid 40 is controllably altered, as a result of the controlled strength of the magnetic flux generated by coil(s) 66 and directed across the channel 54. Subsequently, the MR fluid 40 is forced into the MR fluid chamber 194 and forces the separator piston 190 move toward the end wall 186, thereby compressing the gas within the gas chamber 198. Thereafter, when the compressive forces on the MR damper 34 are removed, and/or extension forces are exerted on the MR damper 34 (e.g., rebound motion), the compressed gas within the gas chamber 198 forces the MR fluid 40 within the MR fluid chamber 194 back through the fluid flow channel 54 where the shear strength, or shear stress, of the MR fluid 40 is controllably altered, as a result of the controlled strength of the magnetic flux generated by coil(s)

66 and directed across the channel 54 passing. Accordingly, the compression (or jounce) and extension (or rebound) of MR damper 34 can be controlled. Moreover, when the coil cover(s) 82 is/are multi-section covers, as described herein, the control ratio of the MR valve 50, and hence the MR damper 34, is significantly increased.

Referring now to FIGS. 9, 10 and 11, although not specifically shown in the various embodiments of the MR valve 50 illustrated, by way of example, in FIGS. 9, 10 and 11, it is envisioned that, in various embodiments, the ends of the respective fluid flow channel 54 can be chamfered, angled, funnel shaped or include a bezel to provide a larger diameter at the ends from that of a central portion of the respective fluid flow channel 54. As described above, the chamfered, angled, funnel shaped or bezelled ends are structured and operable to allow the MR fluid to enter and exit the respective fluid flow channel 54 more easily and with less turbulence and/or disruption, thereby increasing the on-state force, and decreasing the off-state force of the MR fluid flowing through the channel 54, which in turn, further increases the control ratio of the MR valve 34. Additionally, it should be noted that in various embodiments wherein the respective housing (e.g., housing 122, 140 and/or 182) comprises the flux ring 62, the MR damper 34 can reject heat quicker and easier than the embodiments wherein the MR damper 34 includes a flux ring 62 that is disposed within the respective housing. Particularly, having the housing 38 function as the flux ring 62 provides a shorter dissipation path for the heat generated within the MR damper 34. More particularly, the exposure of the outside of the housing to the ambient environment helps maintain the housing/flux ring 38/62 at a cooler temperature such that the housing/flux ring 38/62 will absorb and dissipate the generated heat more efficiently.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A magnetorheological damper, said damper comprising:
   a housing at least partially filled with a magnetorheological fluid;
   an inner body centrally disposed within the housing such that an outer chamber is defined between the inner body and the housing, the inner body defining an inner chamber that is fluidly connected to the outer chamber, the inner chamber and outer chamber at least partially filled with the magnetorheological fluid; and
   a magnetorheological valve disposed within the housing, the valve comprising:
      a flux ring fabricated of a magnetically permeable material, the flux ring provided by and comprising at least a portion of the housing;
      a magnetically permeable core having at least one coil reservoir formed therein;
      at least one conductor coil, each conductor coil disposed around a portion of the core within a respective one of the at least one coil reservoir formed within the core;
      a fluid flow channel adjacent the at least one conductor coil, the fluid flow channel structured and operable to allow the magnetorheological fluid to flow adjacent the at least one conductor coil; and
      at least one coil cover, each coil cover disposed over a respective one of the at least one coil such that the respective coil is protected from exposure to magnetorheological fluid flowing through the fluid flow channel, wherein the at least one coil cover comprises at least one magnetically permeable section fabricated of a magnetically permeable material such that each magnetically permeable section provides a portion of an active length of the valve; and at least one magnetic isolator section fabricated of a non-magnetically permeable material such that each magnetic isolator section provides at least a portion of an inactive length of the valve; and
   a piston bidirectionally movably disposed within the inner chamber.

2. The damper of claim 1, wherein:
   the at least one magnetically permeable section of each multi-section coil cover comprises a first magnetically permeable section comprising a first band disposed over a first portion of the respective conductor coil disposed within the respective coil reservoir;
   the at least one magnetic isolator section comprises a magnetic isolator band disposed over a second portion of the respective conductor coil disposed within the respective coil reservoir; and
   the at least one magnetically permeable section of each multi-section coil cover further comprises a second magnetically permeable section comprising a second band disposed over a third portion of the respective conductor coil disposed within the respective coil reservoir.

3. The damper of claim 2 wherein:
   the at least one coil reservoir formed within the core comprises a plurality of coil reservoirs:
   the at least one conductor coil comprises a plurality conductor coils; and
   the at least one multi-section coil cover comprises a plurality of magnetic isolator sections and a plurality of magnetically permeable sections.

4. The damper of claim 1, wherein the magnetically permeable core comprises an annular magnetically permeable core disposed within the outer chamber such that the fluid flow channel is defined between the annular magnetically permeable core and the housing.

5. The damper of claim 4, wherein the inner chamber is fluidly connected to the outer chamber via windows formed in ends of the inner body.

6. A vehicle suspension system, said suspension system comprising:
   a magnetorheological damper, said damper comprising
   a housing at least partially filled with a magnetorheological fluid;
   an inner body centrally disposed within the housing such that an outer chamber is defined between the inner body and the housing, the inner body defining an inner chamber that is fluidly connected to the outer chamber, the inner chamber and outer chamber at least partially filled with the magnetorheological fluid; and a magnetorheological valve disposed within the housing, the valve comprising:
  a flux ring fabricated of a magnetically permeable material, the flux ring provided by and comprising at least a portion of the housing;
  a magnetically permeable core having at least one coil reservoir formed therein;
  at least one conductor coil, each conductor coil disposed around a portion of the core within a respective one of the at least one coil reservoir formed within the core;
  a fluid flow channel adjacent the at least one conductor coil, the fluid flow channel structured and operable to allow the magnetorheological fluid to flow adjacent the at least one conductor coil; and
  at least one coil cover, each coil cover disposed over a respective one of the at least one coil such that the respective coil is protected from exposure to magnetorheological fluid flowing through the fluid flow channel, wherein the at least one coil cover comprises multi-section coil cover comprising at least one magnetically permeable section fabricated of a magnetically permeable material such that each magnetically permeable section provides a portion of an active length of the valve; and at least one magnetic isolator section fabricated of a non-magnetically permeable material such that each magnetic isolator section provides at least a portion of an inactive length of the valve; and
  a piston bidirectionally movably disposed within the inner chamber.

7. The vehicle of claim 6, wherein the magnetically permeable core comprises an annular magnetically permeable core disposed within the outer chamber such that the fluid flow channel is defined between the annular magnetically permeable core and the housing.

8. The vehicle of claim 7, wherein the inner chamber is fluidly connected to the outer chamber via windows formed in ends of the inner body.

9. The vehicle of claim 6, wherein:
  the at least one magnetically permeable section of each multi-section coil cover comprises a first magnetically permeable section comprising a first band disposed over a first portion of the respective conductor coil disposed within the respective coil reservoir;
  the at least one magnetic isolator section comprises a magnetic isolator band disposed over a second portion of the respective conductor coil disposed within the respective coil reservoir; and
  the at least one magnetically permeable section of each multi-section coil cover further comprises a second magnetically permeable section comprising a second band disposed over a third portion of the respective conductor coil disposed within the respective coil reservoir.

10. The vehicle of claim 9 wherein:
  the at least one coil reservoir formed within the core comprises a plurality of coil reservoirs;
  the at least one conductor coil comprises a plurality conductor coils; and
  the at least one multi-section coil cover comprises a plurality of magnetic isolator sections and a plurality of magnetically permeable sections.

11. A vehicle suspension system, said suspension system comprising:
  a magnetorheological damper, said damper comprising
  a housing at least partially filled with a magnetorheological fluid;
  an inner body centrally disposed within the housing such that an outer chamber is defined between the inner body and the housing, the inner body defining an inner chamber that is fluidly connected to the outer chamber, the inner chamber and outer chamber at least partially filled with the magnetorheological fluid;
  a magnetorheological valve disposed within the housing, the valve comprising:
    a flux ring fabricated of a magnetically permeable material, the flux ring provided by and comprising at least a portion of the housing;
    a magnetically permeable core having at least one coil reservoir formed therein;
    at least one conductor coil, each conductor coil disposed around a portion of the core within a respective one of the at least one coil reservoir formed within the core;
    a fluid flow channel adjacent the at least one conductor coil, the fluid flow channel structured and operable to allow the magnetorheological fluid to flow adjacent the at least one conductor coil; and
    at least one coil cover, each coil cover disposed over a respective one of the at least one coil such that the respective coil is protected from exposure to magnetorheological fluid flowing through the fluid flow channel, wherein the at least one coil cover comprises multi-section coil cover comprising at least one magnetically permeable section fabricated of a magnetically permeable material such that each magnetically permeable section provides a portion of an active length of the valve; and at least one magnetic isolator section fabricated of a non-magnetically permeable material such that each magnetic isolator section provides at least a portion of an inactive length of the valve; and
  a piston bidirectionally movably disposed within the inner chamber.

12. The vehicle of claim 11, wherein the magnetically permeable core comprises an annular magnetically permeable core disposed within the outer chamber such that the fluid flow channel is defined between the annular magnetically permeable core and the housing.

13. The vehicle of claim 12, wherein the inner chamber is fluidly connected to the outer chamber via windows formed in ends of the inner body.

14. The vehicle of claim 11, wherein:
  the at least one magnetically permeable section of each multi-section coil cover comprises a first magnetically permeable section comprising a first band disposed over a first portion of the respective conductor coil disposed within the respective coil reservoir;
  the at least one magnetic isolator section comprises a magnetic isolator band disposed over a second portion of the respective conductor coil disposed within the respective coil reservoir; and
  the at least one magnetically permeable section of each multi-section coil cover further comprises a second magnetically permeable section comprising a second band disposed over a third portion of the respective conductor coil disposed within the respective coil reservoir.

15. The vehicle of claim 14 wherein:

the at least one coil reservoir formed within the core comprises a plurality of coil reservoirs:

the at least one conductor coil comprises a plurality conductor coils; and the at least one multi-section coil cover comprises a plurality of magnetic isolator sections and a plurality of magnetically permeable sections.

\* \* \* \* \*